May 26, 1936.  W. THOMPSON  2,041,980
BRAKE
Filed April 13, 1935
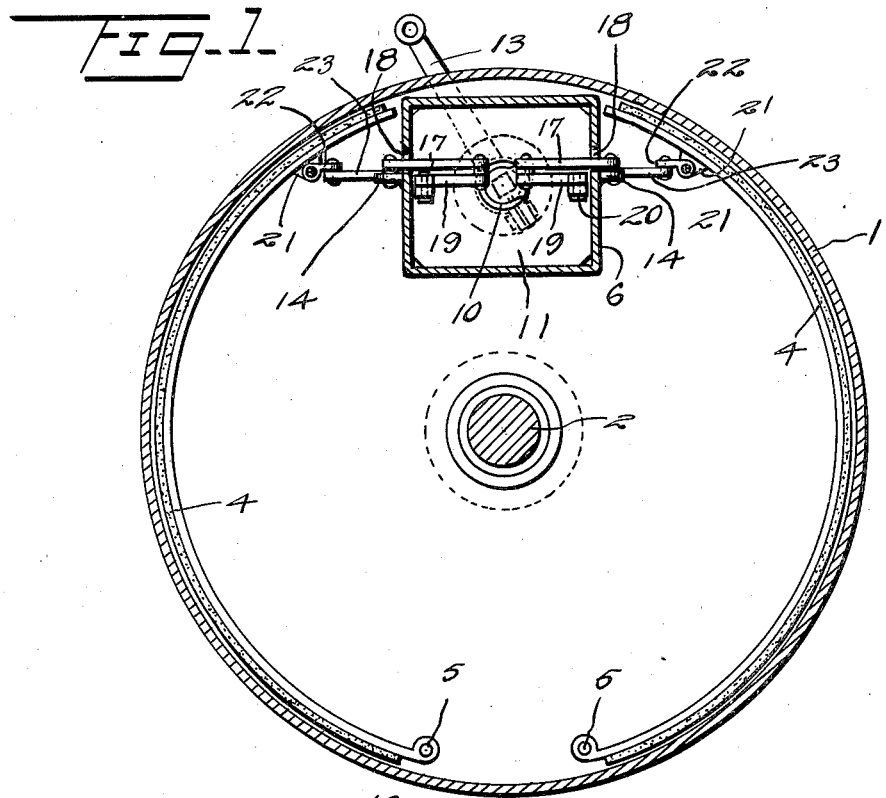
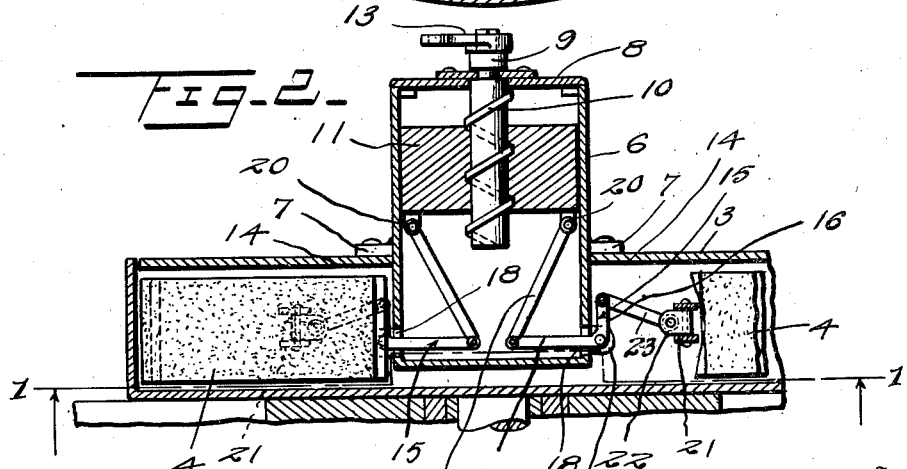
Inventor
Wm. Thompson
By Watson E. Coleman
Attorney Patented May 26, 1936

2,041,980

UNITED STATES PATENT OFFICE 2,041,980

BRAKE

William Thompson, Fisk, Mo.

Application April 13, 1935, Serial No. 16,232

3 Claims. (Cl. 188—78)

This invention relates to the class of brakes and pertains particularly to mechanical brakes of the type normally employed on motor vehicles.

The primary object of the present invention is to provide a new and novel type of internal expanding brake wherein screw means is employed for imparting motion to the brake bands to effect their contact with an adjacent drum.

Another object of the invention is to provide a brake having a screw and nut operating means which is of simple design but by which rapid actuation of the brakes may be effected with a minimum of motion of the foot or hand operating mechanism.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention.

In the drawing:—

Figure 1 illustrates a sectional view of a brake mechanism taken on the line 1—1 of Figure 2 perpendicular to the axis of the brake showing the present improved mechanism coupled therewith.

Figure 2 is a sectional view taken horizontally through the operating mechanism, a portion of the brake band being broken away.

Referring now more particularly to the drawing, the numeral 1 indicates the drum of a motor vehicle or any other type of vehicle wherein the brake of the character described may be employed, the axle of the vehicle being indicated generally by the numeral 2 and the fixed plate usually associated with the drum of a brake of the character set forth being indicated by the numeral 3.

In carrying out the present invention there is illustrated a friction means which comprises two brake shoes, each of which is indicated by the numeral 4, and each of which is oscillatably secured, as at 5, to the fixed plate 3 of the brake providing two free relatively movable ends. It is obvious that a split band mounted on the drum would also provide such ends to which the actuating mechanism about to be described, might be connected.

Disposed between the free ends of the band or the two shoes illustrated, is the actuating mechanism comprising the present invention and this includes an elongated housing 6 of polygonal cross section which has an end extended through a suitable opening in the plate 3 and is secured to this plate by the ears 7 so as to lie parallel with the axle 2, which forms the axis of the brake. At the outer end of the housing 6, a head plate 8 is secured to which is swivelly coupled the oscillatable shaft 9 which has its major portion within the housing 6. This portion of the shaft 9 in the housing 6 is provided with the coarse thread 10 and a nut 11 is secured to the shaft by means of these threads, which nut is of the same cross section as the housing 6 so that when the shaft 9 is oscillated, the threads will force the nut to move longitudinally in the housing.

At its outer end the thread carrying shaft 9 has a lever arm 13 secured thereto by means of which motion may be imparted to the shaft from the motor vehicle foot or hand lever through suitable connecting mechanism, which is not shown.

Within the drum of the brake, the housing 6 has the two ears 14 attached thereto and to each of these ears is pivotally attached a bell crank lever which is indicated generally by the number 15 and which has the two arms 16 and 17. The housing 6 has an opening 18 therein through each side wall and adjacent the ear 14, and a bell crank is shifted at the point of joinder between its two arms upon an ear 14 with the longer arm 17 thereof extending through the adjacent housing opening 18 into the interior of the housing 6 while the shorter arm lies within the drum and adjacent to the outside of the housing side wall.

Within the drum each bell crank has the free end of its long arm 17 pivotally attached to one end of a link 19 which has its other end pivotally attached to an ear 20 carried upon the forward face of the nut 11.

Adjacent each of its free ends, the brake band or each brake band section 4 has a pair of ears 21 upon its under face between which is pivotally attached a hinge ear 22 which has the free end of the arm 16 of the adjacent bell crank pivotally joined thereto.

Outside of the housing 6 and within the brake drum, the free end of the short arm 16 of each bell crank is pivotally connected with the adjacent hinge ear 22 by a short link 23.

From the foregoing, it will be apparent that in the operation of the present brake mechanism, when a pull is applied to the lever 13 to oscillate the shaft 9 in one direction, the nut 11 will be moved outwardly on the shaft toward the end 8 of the housing so as to pull the links 19 and oscillate the bell cranks 15 in the necessary direction to spread the free ends of the brake band apart and force them to contact with the drum. By reversely actuating the lever 13, the nut will be moved forwardly and will pull the ends of the band away from the drum so as to release the brake.

Having thus described the invention, what is claimed is:—

1. In a brake including a drum and friction means mounted in the drum including two ends separable for effecting contact of the means with the drum, actuating means comprising an elongated guide body disposed between the said ends to extend parallel with the axis of the drum, a threaded nut member carried by said guide means for movement thereon, a screw supported for oscillatory motion in said guide means and having said nut threaded thereon, means for effecting the oscillation of said screw, a bell crank pivotally mounted adjacent each of the said ends and having a pair of divergent arms, one of the arms of each bell crank extending into the guide means, connecting means between said nut and the free end of each of the bell crank arms extending into the guide means and pivotal connecting means between the free end of the other arm of each bell crank and the adjacent one of said ends.

2. In a brake including a drum and friction means mounted therein including two ends separable for effecting contact of the means with the drum, a screw mounted for oscillation adjacent said ends with its longitudinal axis extending transversely of the drum, a nut threaded on the screw, means retaining the nut against rotation with the screw but permitting its movement longitudinally thereof, and means pivotally coupling the nut with the said friction element ends whereby the ends will be made to positively move relative to the drum by the shifting of said nut in either direction on the screw.

3. In a brake including a drum, friction means mounted in the drum including two ends separable for effecting contact of the means therewith and a fixed plate closing one side of the drum and having an opening therethrough, an elongated closed housing having an end extended through said opening and into proximity with said ends, a screw extending longitudinally in the housing and oscillatably mounted in the end thereof remote from the drum, the housing being of polygonal cross-section, a nut in and conforming in contour with the cross-sectional outline of the housing and threaded on the screw, means at the outer end of the screw for effecting its oscillation, and mechanism coupling the nut through the wall of the housing with the ends of the friction means, whereby relative movement of said ends will be effected upon movement of the nut.

WILLIAM THOMPSON.